Feb. 25, 1958 J. M. GAMBLE 2,824,536
TRUE LINING VISE OR JIG
Filed June 18, 1954 2 Sheets-Sheet 1
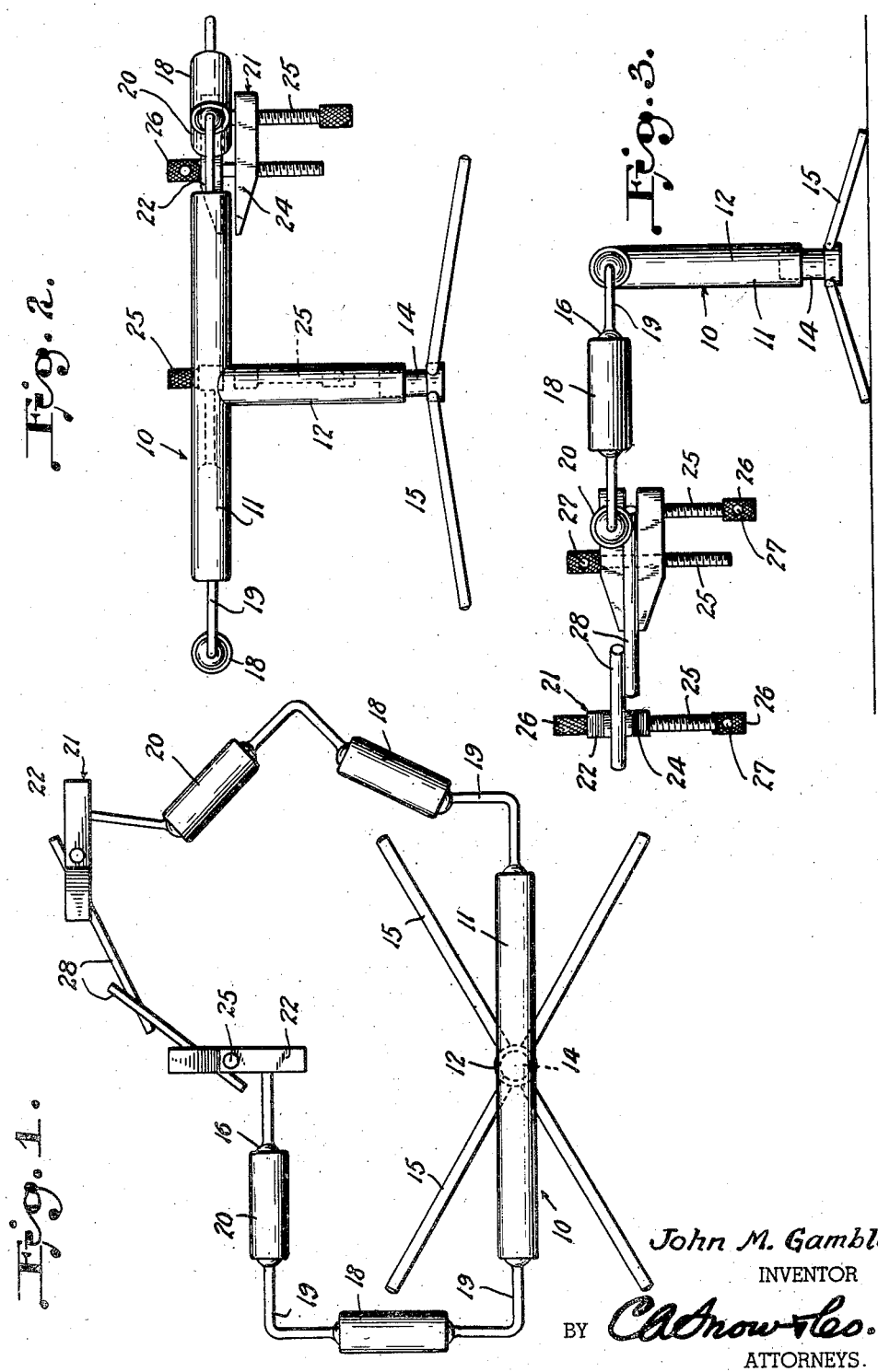
John M. Gamble
INVENTOR
ATTORNEYS.

Feb. 25, 1958     J. M. GAMBLE     2,824,536
TRUE LINING VISE OR JIG
Filed June 18, 1954     2 Sheets-Sheet 2
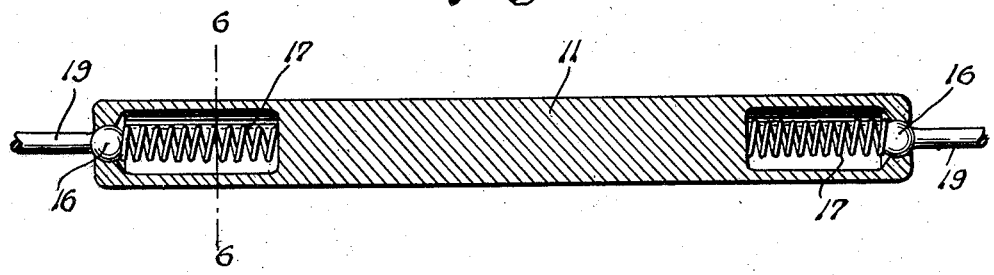
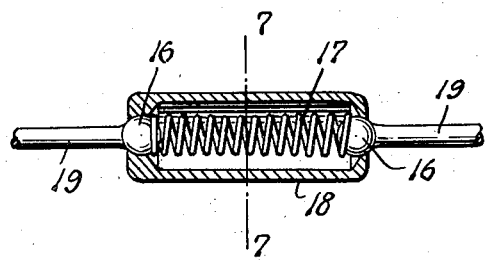 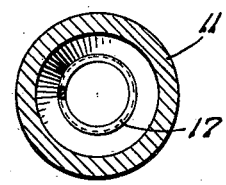
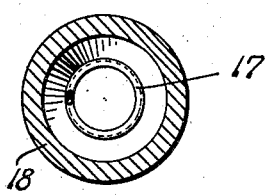 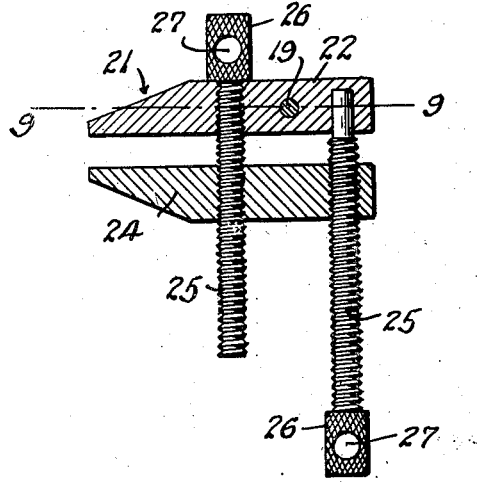
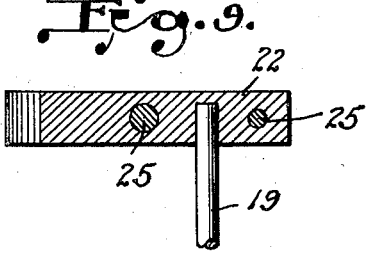
John M. Gamble
INVENTOR
BY *CA Snowles*
ATTORNEYS.

United States Patent Office 2,824,536
Patented Feb. 25, 1958

2,824,536

TRUE LINING VISE OR JIG

John M. Gamble, Burlington, Iowa

Application June 18, 1954, Serial No. 437,832

2 Claims. (Cl. 113—104)

This invention relates to a true lining vise or jig.

It is a principal of this invention to provide a vise or jig having work engaging clamps swivelly related to each other and a common support for both whereby the clamps and work pieces may be easily and readily moved to a selected angular relation to each other and their support.

It is another object of this invention to provide a true lining vise or jig of the kind to be more particularly described hereinafter particularly useful for welding, soldering, brazing or other like means for securing various elements together when disposed in spaced relation to a rigid support.

It is a further object of this invention to provide a vise or jig having a pair of work engaging clamps swivelly connected to a common support whereby the work pieces may be held in any desired angular relation to each other while the work is being performed for the connection of the work pieces together. A hollow tube having a swivel element at each end with a resilient member between the swivel elements is used in place of set screws or clamps for holding the angled joints in their desired angular relation.

It is yet a further object of this invention to provide a true lining jig or vise of this kind having a pair of work pieces holding clamps universally related to each other and a common support whereby the work pieces are held in any desired angular relation to each other while the work pieces are being secured together.

Other and further objects and advantages of the invention will be hereinafter described and the novel features thereof defined in the appended claims.

In the drawings:

Fig. 1 is a top plan view of the jig or vise constructed according to an embodiment of my invention.

Fig. 2 is a side elevation.

Fig. 3 is a front elevation.

Fig. 4 is an enlarged detailed longitudinal section of the common swivel connection for the clamps.

Fig. 5 is a transverse cross section of one end of the common tube with the swivel elements removed.

Fig. 6 is a transverse cross section taken on the line 6—6 of Fig. 4.

Fig. 7 is a transverse cross section taken on the line 7—7 of Fig. 5.

Fig. 8 is an enlarged longitudinal section through one of the clamps.

Fig. 9 is a transverse cross section taken on the line 9—9 of Fig. 8.

Heretofore when connecting two sections of metal together by welding, soldering or brazing it has been very difficult to secure the two pieces of metal together while the process of joining the metal together has been accomplished. It is a primary object of this invention to provide a vise or jig which will clamp the two pieces together while they are being worked upon. Furthermore the vise or jig is light in weight and easily movable from one place to another whenever such movement may be desired by the person performing the joining operation.

As such joining together of the separate pieces at a definite angle is the primary object of this invention I have provided a true lining jig or vise 10 which is engageable with the separate elements of work to be joined together.

The true lining jig or vise 10 includes a central tubular member 11 having a fixed intermediate the length thereof. The tubular member or support 12 is open at the lower end thereof for receiving therein a supporting lug 14 which is provided with outwardly extending legs 15 which are engageable with a surface to be worked upon.

There is provided a ball 16, or any other spherical swivel member at each end of the central tube member 11 and a coil spring 17 is disposed within the length of the central tube or member 11 constantly urging the balls 16 outwardly toward the ends of the central member.

The clamps for engagement with the work to be welded or worked upon is swivelly connected to the central tube 11 by way of other swivel connections to be herein described.

There is provided an intermediate swivel tube 18 which is connected to the central tube 11 by way of a rod 19 which extends outwardly from the outermost ball 16 in the central tube.

A third or outer tube 20 is swivelly connected to the outer end of the intermediate swivel tubes 18 and a clamp 21 is carried or attached to the outer swivel tube 20. The clamp 21 includes a jaw member 22 as the upper jaw member and a lower jaw member 24. The clamp 21 is much in the same manner as a conventional type of vise having the upper and lower clamping jaws and the uppermost of the jaws 22 is secured to the outer swivel tube 20 by way of the connecting rod 19. Here again the connecting rod 19 is fastened or formed intergal with the balls 16 of both the intermediate swivel connector and the outer swivel connector as clearly indicated in the drawings.

As a matter of fact there are two swivel connectors between the opposite ends of the center tube member 11 which is connected to its support and the pieces clamped in the clamps 21 to be worked upon.

As the work to be performed on the work members may be soldering, brazing or welding or the like, the work members are to be securely held in their positions relative to each other while the work is being performed.

It may be noted from the drawings that certain ones of the rods 19 are bent at an angle, substantially 90°, intermediate the length thereof so that the work pieces may be moved to a position relatively in engagement with each other and thus form a sort of closed circuit from one clamp to the other clamp through the work pieces and the support for the jig.

As the clamp 21 is provided with a pair of jaws as the jaw 22 and the jaw 24 a screw 25 is engaged through the jaws for pulling the jaws together in clamping engagement with the work to be processed from the true line jig. One of the screws 25 is reduced in diameter at one end thereof for rotatably engaging in one of the jaws whereas the other screw 25 is threaded completely through one of the jaws for tightening the jaws on the work piece, the clamp 21 being formed in a substantially conventional manner. Each of the screws 25 has a knurled end or head 26 remote from the respective jaws so that the screw 25 may be easily turned by the fingers of a person using the jig. Also each of the heads or ends of the screws remote from the jaws has a hole 27 therethrough for the reception of a pin or other tool for turning the screw 25.

The work pieces are designated generally in the drawings by the reference numeral 28 and it can be seen from the drawings and the above description of how the various swivel elements are connected together and to the support therefor so that no further description as to the use and operation is believed to be necessary.

While the specific details of one embodiment of this invention have been herein shown and described, the invention is not confined thereto as changes and alterations may be made without departing from the spirit and scope thereof as defined in the appended claims.

I claim:

1. A true lining vise or jig comprising an elongated central tubular member open at the ends thereof, a swivel ball at each end of said central member, a coiled spring in said central member engaging said balls urging said balls toward the outer ends thereof, a right angular connecting rod on each of said balls extending outwardly from said central member, an intermediate tubular member open at the ends thereof adjacent each end of said central member, a pair of balls in each of said intermediate members, a coiled spring in each of said intermediate members urging said balls toward the outer ends thereof, the connecting rod at each end of said central member being connected to one ball of the adjacent intermediate member, an outer tubular member open at the ends thereof, adjacent each of said intermediate members, a pair of balls in each of said outer members, a coiled spring in each of said outer members urging said balls toward the ends of said outer members, a right angular connecting rod between one ball of each of said outer members and the other ball of the adjacent intermediate member, a straight rod connected to the other of said balls in said outer member, a work engaging clamp connected to the other end of each straight connecting rod and a support engaging said central member intermediate the ends thereof, said vise or jig providing for the universal swivel movement of the articles in said clamps for work being accomplished thereon.

2. A true lining vise or jig comprising a horizontal bar, a support for said bar, ball sockets in each end of said bar, a pair of intermediate tubular socket members, a pair of outer tubular socket members, a plurality of right angle bars, a ball on each end of said bars, said balls engaging in said sockets and said socket members, a spring in each socket bearing against a ball to frictionally hold the latter against turning, a single spring in each tubular socket member bearing at the opposite ends thereof against said balls, a pair of work clamps, a bar extending from each clamp, and a ball on each of said latter bars engaging in an adjacent outer socket member, said balls and sockets providing for universal adjustment of said clamp relative to each other.

References Cited in the file of this patent
UNITED STATES PATENTS

| | | |
|---|---|---|
| 546,421 | Duke | Sept. 17, 1885 |
| 574,529 | Elliott | Jan. 5, 1897 |
| 966,369 | Thompson et al. | Aug. 2, 1910 |
| 1,084,130 | Cargin | Jan. 13, 1914 |
| 1,306,858 | Salter | June 17, 1919 |
| 1,386,318 | Cowan | Aug. 2, 1921 |
| 1,446,811 | Rowland | Feb. 27, 1923 |
| 2,324,803 | Snyder | July 20, 1943 |
| 2,669,958 | Sweeney | Feb. 23, 1954 |

FOREIGN PATENTS

| | | |
|---|---|---|
| 804,357 | France | Oct. 22, 1936 |